United States Patent [19]
Takahashi et al.

[11] Patent Number: 5,796,955
[45] Date of Patent: Aug. 18, 1998

[54] METHOD FOR CONTROLLING THE CONFIRMATION OF ASSOCIATION ON AN APPLICATION LAYER OF OPEN SYSTEMS INTERCONNECTION BETWEEN ONE COMMUNICATION EQUIPMENT AND A FACING COMMUNICATION AND A LOOP CARRIER SYSTEM USING THE METHOD

[75] Inventors: Souichi Takahashi; Satoshi Yasutaka, both of Kanazawa, Japan

[73] Assignee: Fujitsu Limited, Kanagawa, Japan

[21] Appl. No.: 900,044

[22] Filed: Jul. 24, 1997

Related U.S. Application Data

[63] Continuation of Ser. No. 333,521, Nov. 2, 1994, abandoned.

[30]   Foreign Application Priority Data

May 18, 1994   [JP]   Japan ................................ 6-128178

[51] Int. Cl.$^6$ ...................... G06F 13/38; G06F 15/16; H04L 29/08
[52] U.S. Cl. .................... 395/200.62; 370/474; 395/500
[58] Field of Search ................ 395/500, 200.65, 395/82.18, 183.01, 185.1, 670, 200.62; 370/469, 392, 474; 364/DIG. 1, DIG. 2

[56]   References Cited

U.S. PATENT DOCUMENTS

| | | | |
|---|---|---|---|
| 4,195,351 | 3/1980 | Barner et al. | 300/825.05 |
| 4,506,361 | 3/1985 | Kume | 370/85.2 |
| 4,589,111 | 5/1986 | Adachi | 371/32 |
| 4,691,314 | 9/1987 | Bergins et al. | 370/94.1 |
| 4,887,162 | 12/1989 | Arai | 371/31 |
| 4,894,847 | 1/1990 | Tjahjadi et al. | 375/377 |
| 5,392,443 | 2/1995 | Sakakibara et al. | 395/800 |
| 5,566,170 | 10/1996 | Bakke et al. | 370/382 |

FOREIGN PATENT DOCUMENTS 567012   3/1993   Japan .

Primary Examiner—Daniel H. Pan
Attorney, Agent, or Firm—Helfgott & Karas, P.C.

[57]   ABSTRACT

A method for controlling associations in time of executing an application layer in OSI (Open Systems Interconnection) between one communication equipment and the faced communication equipment is disclosed. An association confirmation request is sent from one communication equipment to the faced communication equipment. A reason of the rejection is identified when the faced communication equipment rejects the association confirmation request, and then, the association confirmation request is retransmitted according to the reason of rejection. The times of retransmission is counted to finish retransmitting the association confirmation request in the case where the count value exceeds a predetermined value.

12 Claims, 17 Drawing Sheets

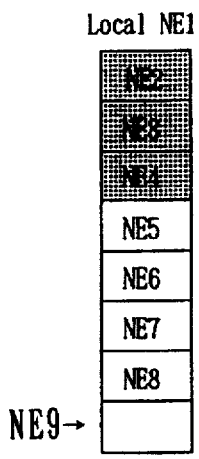 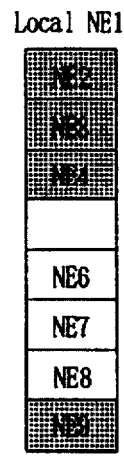 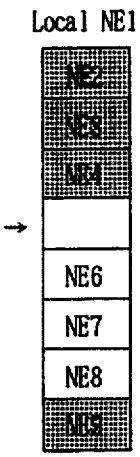 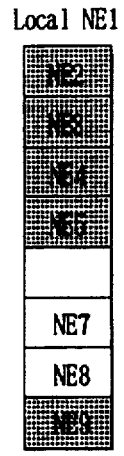
FIG.17A   FIG.17B   FIG.17C   FIG.17D
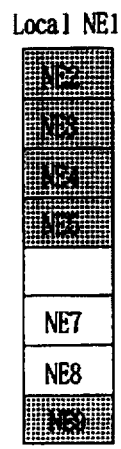 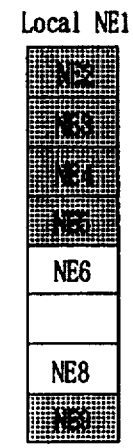 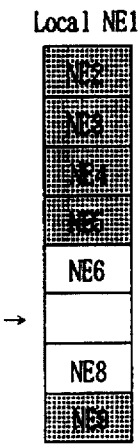 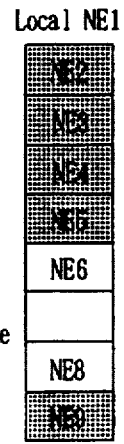
FIG.17E   FIG.17F   FIG.17G   FIG.17H

METHOD FOR CONTROLLING THE CONFIRMATION OF ASSOCIATION ON AN APPLICATION LAYER OF OPEN SYSTEMS INTERCONNECTION BETWEEN ONE COMMUNICATION EQUIPMENT AND A FACING COMMUNICATION AND A LOOP CARRIER SYSTEM USING THE METHOD

This is a continuation, of application Ser. No. 08/333,521, filed Nov. 2, 1994, now abandoned.

BACKGROUND OF THE INVENTION

1. Field of the Invention

The present invention relates to a method for controlling associations on an application layer of OSI (Open Systems Interconnection) and a loop carrier system using the same.

2. Description of the Related Art

In recent years, data information processing has merged communication areas more stronger. However, it was difficult to construct a data communication network to interconnect between different kinds of equipment because each computer maker had been developing its own network.

Therefore, a standard OSI (Open Systems Interconnection) has been proposed to make an intercommunication between different kinds of equipment possible to realize an advanced information-oriented society, under world-wide cooperation.

The OSI is a communication protocol (rule) between different kinds of equipment and a world-wide standard of computer network, such that seven layers of a physical layer, a data link layer, a network layer, a transport layer, a session layer, a presentation layer and an application layer are systematically united on a physical medium, such as a repeater node and a communication path, in order.

The application layer is positioned on the 7th layer, that is, the highest layer, to improve an application job that is the purpose of communication, or in other word, each protocol and each kind of services are prescribed in this layer, relating to each application job.

For example, the service such that one terminal requests one computer for sorting files, and for file-transferring the result of sorting file to the terminal, is prescribed in the layer.

In here, a part concerned to the OSI in an application process (AP) is called as an application entity (AE). The application entity (AE) is like an entrance for entering from a local environment (non-standard environment) to the application process (AP) directly.

A logical communication channel for communication between the application entities (AE) is called as an association. In other word, a cooperative relation established by concerning each application service element of the application entities (AE) on the both ends, mutually, is called as an application association.

An association control service is a basic protocol in the application layer, to provide services relating to the confirmation/releasing the above-described application association to other application association element.

Under the association control service, it is necessary to perform an application process communication between nodes, of which number far exceeds the number of associations by using a finite number of associations effectively, when the associations are confirmed between a large number of nodes.

Formerly, it was possible to access to a same device semi-infinitely by using a virtual memory, in the case where the device was logged in remotely by a work station and the like. However, the number of associations is limited at the time of confirming the associations with other nodes because there is a limit in the memory capacity of firmware.

Therefore, it was impossible to confirm new associations to the node, in the case where the number of confirming associations has already reached to the maximum value of the equipment, that is, it is in busy. Also, the conventional equipment did not have a retransmitting function for confirming the associations.

Accordingly, the users have to repeat the same operation for confirming the associations, in the case where it is refused to confirm the association from a node in the own terminal to a remote node due to the above-described reasons.

SUMMARY OF THE INVENTION

It is therefore an object of the present invention to provide a method for controlling associations of an application layer of OSI (open systems inter-connection), by which the association can be confirmed without repeating the operations by the users, at the time of confirming the associations between many nodes that are located in remote locations.

It is a further object of the present invention to provide a method for controlling associations on an application layer of open systems inter-connection, by which the associations can be confirmed effectively by using an incoming priority and retransmission function of associations as busy control, when the confirmation of the association is limited in number.

It is yet another object of the present invention to provide a method for controlling associations on an application layer of open systems inter-connection, by which a message from each node equipment can be sent to an administration unit, even if it is in the network where the number of node is very larger than a limited number for confirming the associations.

It is still further object of the present invention to provide a method for controlling associations on an application layer of open systems inter-connection, by which an operation and maintenance services of the communication equipment can be improved in line with a rule of an OSI standard, by using the limited number of associations effectively.

It is still another object of the present invention to provide a method for controlling associations on an application layer of open systems inter-connection, by which it becomes possible to keep a transmission channel from the own equipment or a receipt channel from the faced equipment by making, at least, one association idle, in the case where the confirmation of associations in each node equipment is limited in number, so that a large number of associations can be confirmed.

Other objects and advantages of the present invention will become apparent from the detailed description to follow taken in conjunction with the appended claims.

A method for controlling the confirmation of associations on an application layer of OSI (Open Systems Interconnection) between one communication equipment and faced communication equipment according to the present invention comprises the steps of sending an association confirmation request (ASC-REQ) from the one communication equipment to the faced communication equipment, identifying a reason of rejection in the one communication equipment, in the case where the faced communication equipment rejects the association confirmation request (ASC-REQ), retransmitting the association confirmation request (ASC-REQ) according to the reason of rejection and counting times for retransmission, and finishing transmitting of the association confirmation request (ASC-REQ), in the case where the count value of the times for retransmission exceeds a predetermined value.

In carrying out this invention in one preferred mode, a response waiting timer is started in concurrent with sending the association confirmation request (ASC-REQ) from the one communication equipment to the faced communication equipment and an abortion request (ABORT-REQ) is sent to the faced communication equipment when the count of the response waiting timer exceeds a predetermined time to finish transmitting of the association confirmation request (ASC-REQ).

In carrying out this invention in an another preferred mode, a method for controlling the confirmation of associations on an application layer of OSI (Open Systems Interconnection) between one communication equipment and faced communication equipment comprises the steps of sending an association confirmation request (ASC-REQ) from the one communication equipment to the faced communication equipment, maintaining messages due to send in a buffer memory of the one communication equipment and resending the message to the faced communication equipment, when the faced communication equipment rejects the association confirmation request (ASC-REQ), and updating the message into the buffer memory, deleting maintained messages, and recording the fact of that the message deleted by updating, as a log, when the messages due to send exceed the capacity of the buffer memory.

In carrying out this invention in a still another preferred mode, a method for controlling the confirmation of associations on an application layer of OSI (Open Systems Interconnection) between one local node equipment and plural remote node equipment comprises the steps of selecting an oldest association having messages from the plural of associations in the order of time, and disconnecting the selected oldest association, where one local node equipment becomes a client for requesting the association confirmation, when the number of association confirmation exceeds a predetermined number in one local node equipment, and further a new association is confirmed.

In carrying out this invention in a further preferred mode, the predetermined number of confirmed associations include a first association confirmed by an association confirmation request from remote node equipment where local node equipment becomes a server, and a second association confirmed by an association confirmation request to the remote node equipment where the local node equipment becomes a client, and the first association is controlled so as to be confirmed in preference to the second association.

In carrying out this invention in a still further preferred mode, in addition to the predetermined number of confirmed associations include, there is further provided, at least, one idle association to keep associations from a local node equipment or allocatable associations from the faced remote node equipment.

In the present invention, the priority of an incoming and a transmission function of associations are used as busy control, when the confirmation of the associations is limited in number. Therefore, it becomes possible to confirm the associations effectively.

The association confirmation request is retransmitted repeatedly for a fixed times, when the times for retransmission exceeds a fixed value Further, in the form of confirming the associations when the time exceeds a predetermined time, the confirmation of associations in each node equipment is limited in number. Accordingly, it is possible to keep the association sent from the own equipment or the association sent from the faced equipment, by making, at least, one association idle in time of confirming a number of associations.

Consequently, it is capable of sending messages from each node equipment to administration equipment even in the network such that the number of nodes is larger than the limited number of association confirmation.

BRIEF DESCRIPTION OF THE DRAWINGS

FIG. 17 is an explanatory diagram for controlling to confirm the associations in local node equipment (NE1).

DESCRIPTION OF THE PREFERRED EMBODIMENTS

Figure 1:
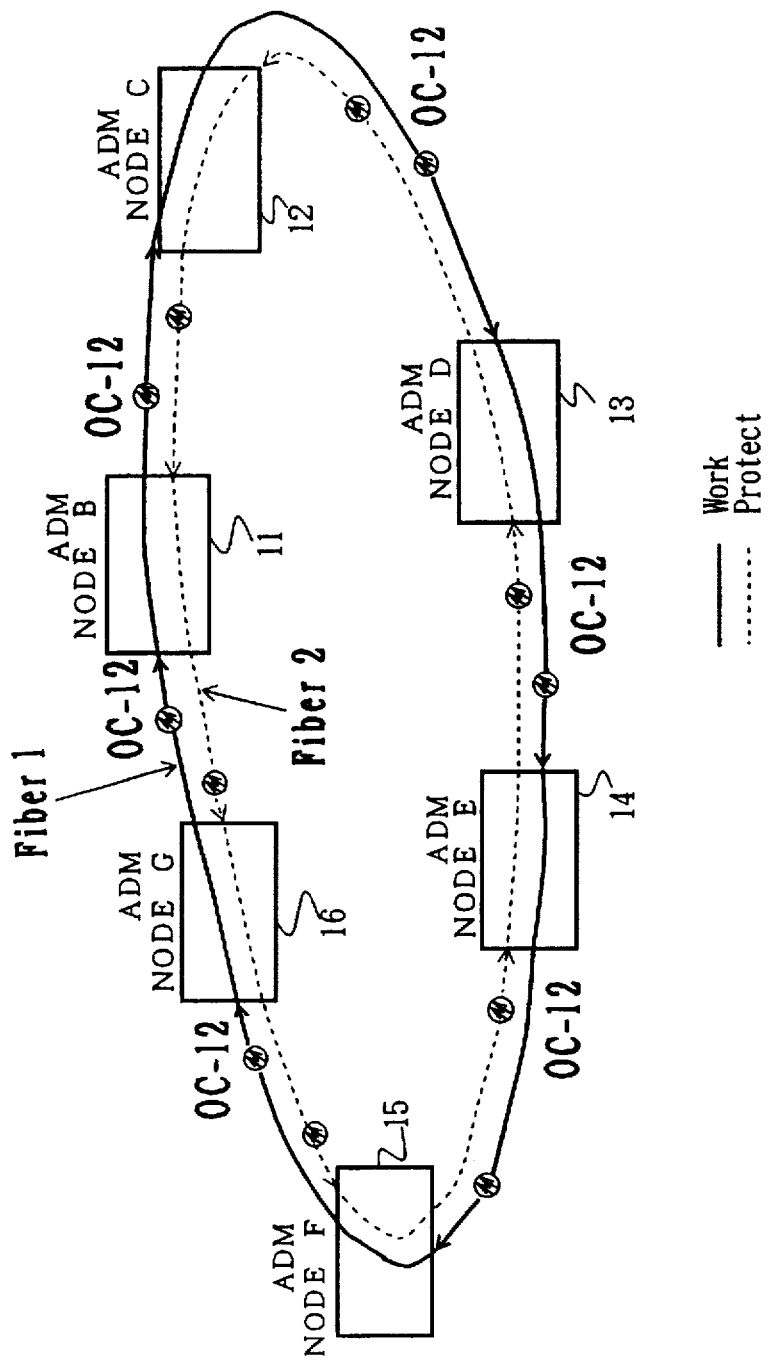
FIG. 1 is a diagram showing one example of a loop carrier system, employing the present invention.

A system to which the present invention is applied as one embodiment will be described for the better understanding, before the detailed explanation of the present invention is made to follow the embodiments. Throughout the following description, the same reference numerals are used to denote and identify corresponding or identical components.

FIG. 1 illustrates one example of a loop carrier system which is composed by connecting each network terminal equipment 11 to 16 with optical fiber transmission paths 1 and 2 that are composed of double structure of work and protect channels in a ring form.

To be concretely, same high-speed optical signals OC-12 are transmitted contrariwise on the optical fiber transmission paths 1 and 2 having the double structure of work and protect channels, in a loop carrier system suitable to the line with a rule of Synchronous Optical Network (SONET).

Each network terminal equipment 11 to 16 has a function for multiplexing low-speed signals OC-1/STS-1 (51.84 Mb/s), DS-3 (44.736 Mb/s), and OC-3 (155.52 Mb/s) to a higher-speed optical signal OC-12 (622.08 Mb/s), and demultiplexing the OC-12 signal conversely, repeating and amplifying function, or an add/drop function for extracting the low-speed signal from the OC-12 signal to tributary equipment, alternatively, and adding the signal from the tributary equipment to the OC-12 signal.

Figure 2:
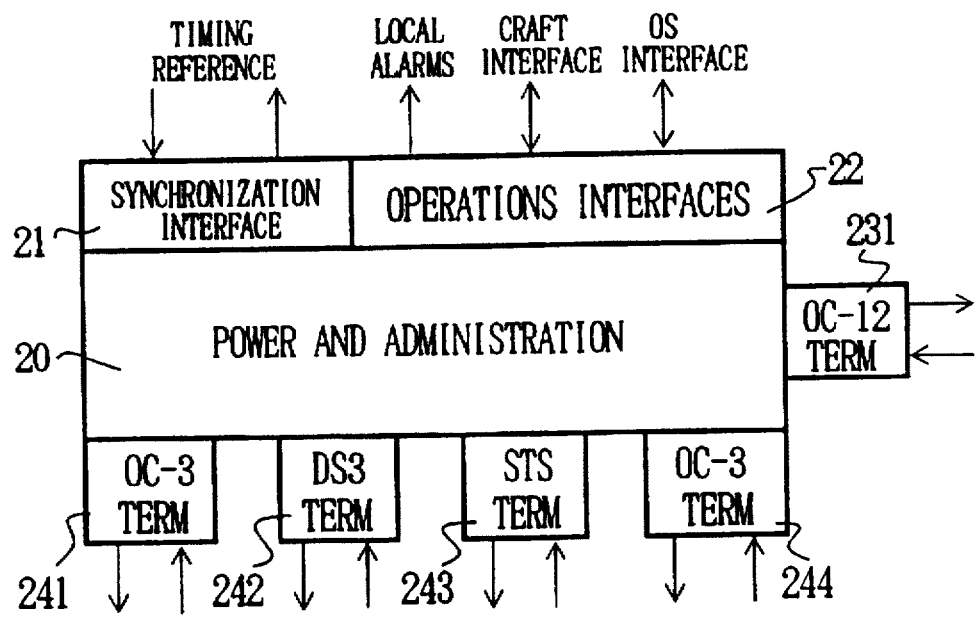
FIG. 2 is a diagram showing functions of terminal equipment in network terminal equipment.
Figure 3:
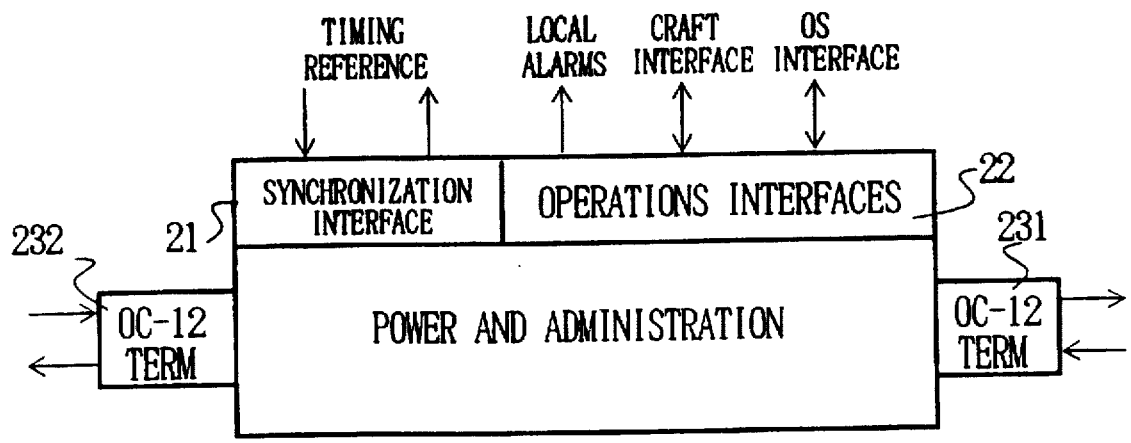
FIG. 3 is a diagram showing an amplifying and repeating function of network terminal equipment.
Figure 4:
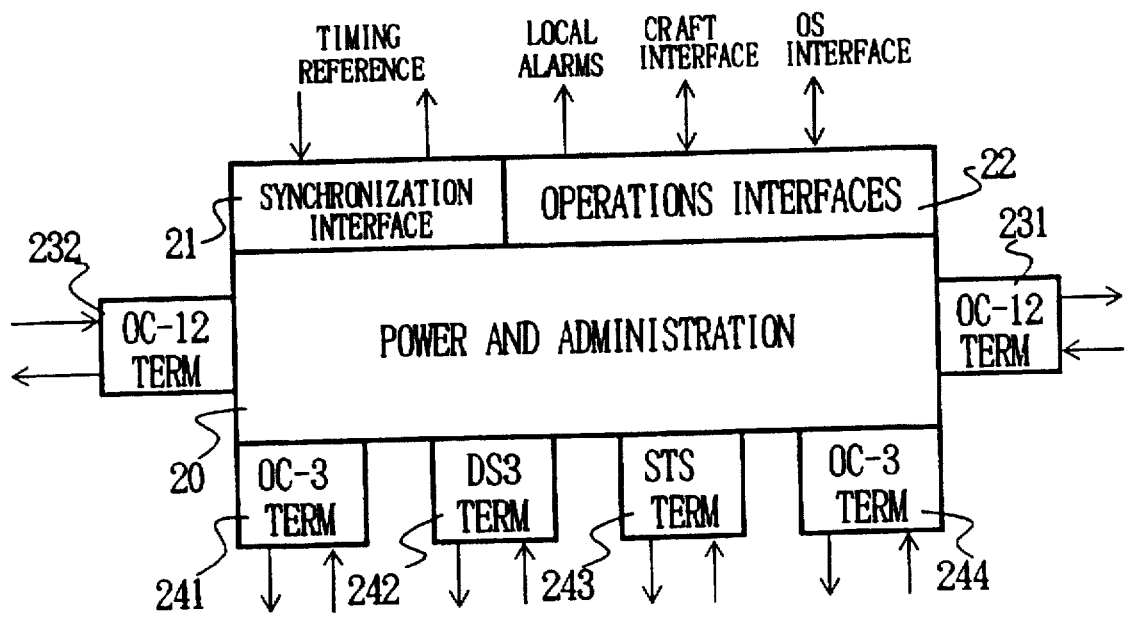
FIG. 4 is a diagram showing an add/drop function of network terminal equipment.

FIGS. 2, 3, 4 are diagrams for respectively showing concepts of a terminal equipment function, an amplifying and repeating function, and an add/drop function of the network terminal equipment applied to the SONET system.

In FIGS. 2 through 4, reference numerals 20, 21, and 22 are a power and administration functional block, a synchronization interface functional block, and an operations interfaces block of an alarm and the like, respectively.

The OC-12 signal is connected to terminals 231 and 232, respectively. Terminals 241 to 244 are connected to tributary equipment to add and drop signals OC-3, DS3 and STS, respectively.

Figure 5:
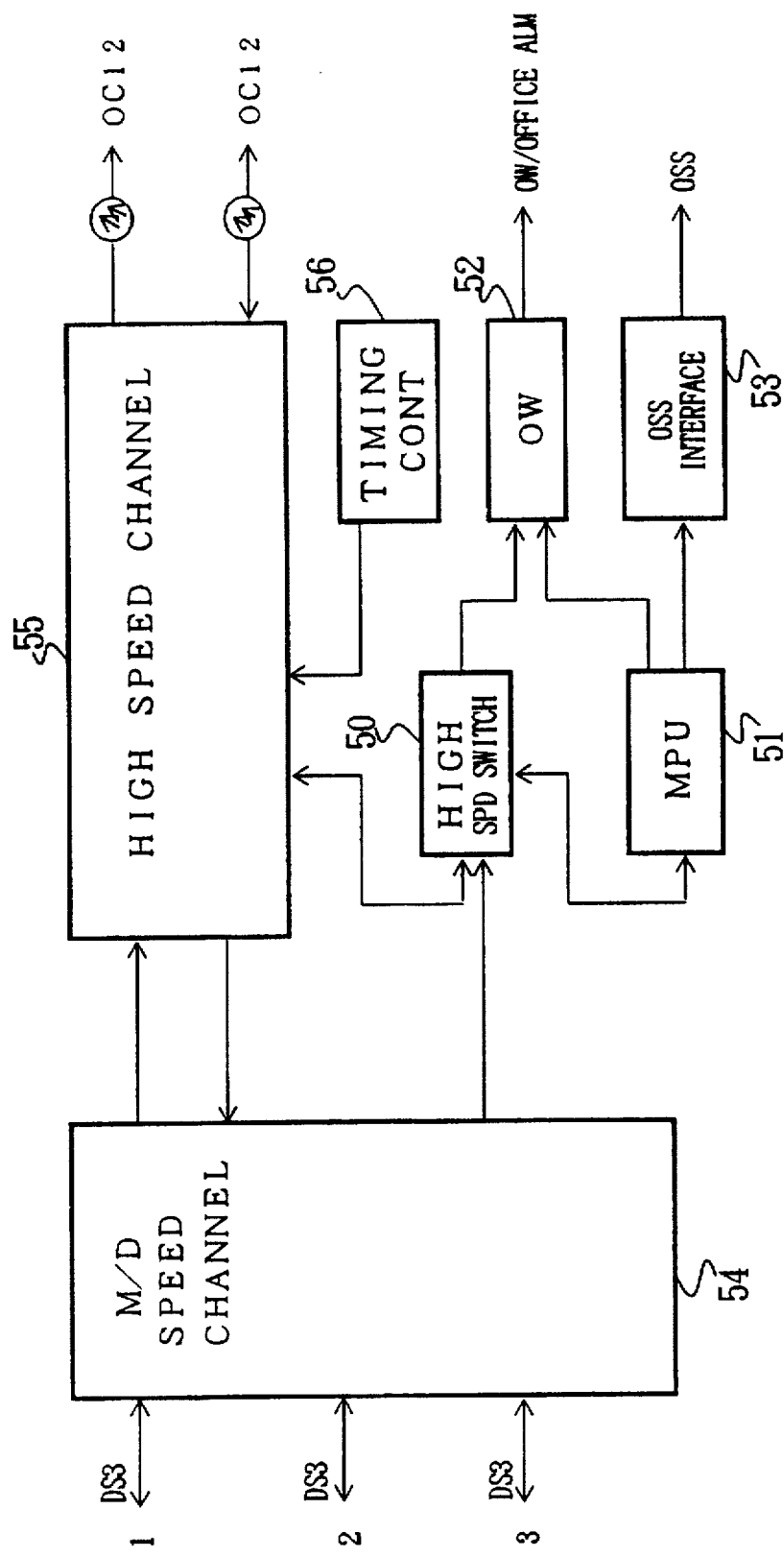
FIG. 5 is a block diagram showing a structural example of network terminal equipment.

FIG. 5 is a block diagram showing a structural example of the network terminal equipment corresponding to the above-described functional block diagram shown in FIG. 4. In the diagram, reference numeral 50 is a high-speed switch unit. The unit 50 controls switching of the high-speed interface unit and transmission paths by accessing to an overhead (OH) byte of the synchronous optical network (SONET) as a high-speed interface function.

The overhead byte is an area in a basic frame structure (STM-N frame) of signal prescribed in ITU-T recommendation G.708 to interface the network nodes for synchronization digital hierarchies. More particularly, it is an area shown in FIG. 5-3/G.708 of the above-described recommendation.

This overhead byte area includes a block frame data, and a data showing other operational functions for maintaining the system and executing the monitor and so on. Further, in FIG. 5, a micro processor unit 51 has a micro processor to control a whole unit, collect information of alarm, status, and setting, and execute the control of switching of the high-speed switch unit 50.

An alarm and order wire unit 52 receives the alarm information from the micro processor unit 51 and outputs a terminal alarm signal, and together, receives an order wire signal from the high-speed switch unit 50 and outputs the signal.

An interface circuit 53 for operation supporting system has a function of providing interface with an add/drop multiplexer and a monitoring system. More particularly, the control method according to the present invention is applied in relation to the structure of the above-described micro processor unit 51 and the interface circuit 53, as described as embodiments later.

A middle speed channel unit 54 has a function of providing interface with three of DS3 signals. The channel 54 also has a function of forming an extracting and inserting path for the overhead byte of STS-1 signal.

A high-speed channel unit 55 supports a terminal ADM (add/drop multiplier) function and a ring structure. The unit 55 having an O/E conversion circuit and an E/O conversion circuit sends the OS-12 optical signal of 622.08 Mb/s to the OS-12 signal path and receives the OS-12 optical signal from the OS-12 signal path.

A timing control circuit 56 supplies a local clock to the high-speed channel unit 55. Further, the circuit 56 sends and receives the order wire signal to and from the high-speed switch unit 50.

Figure 6:
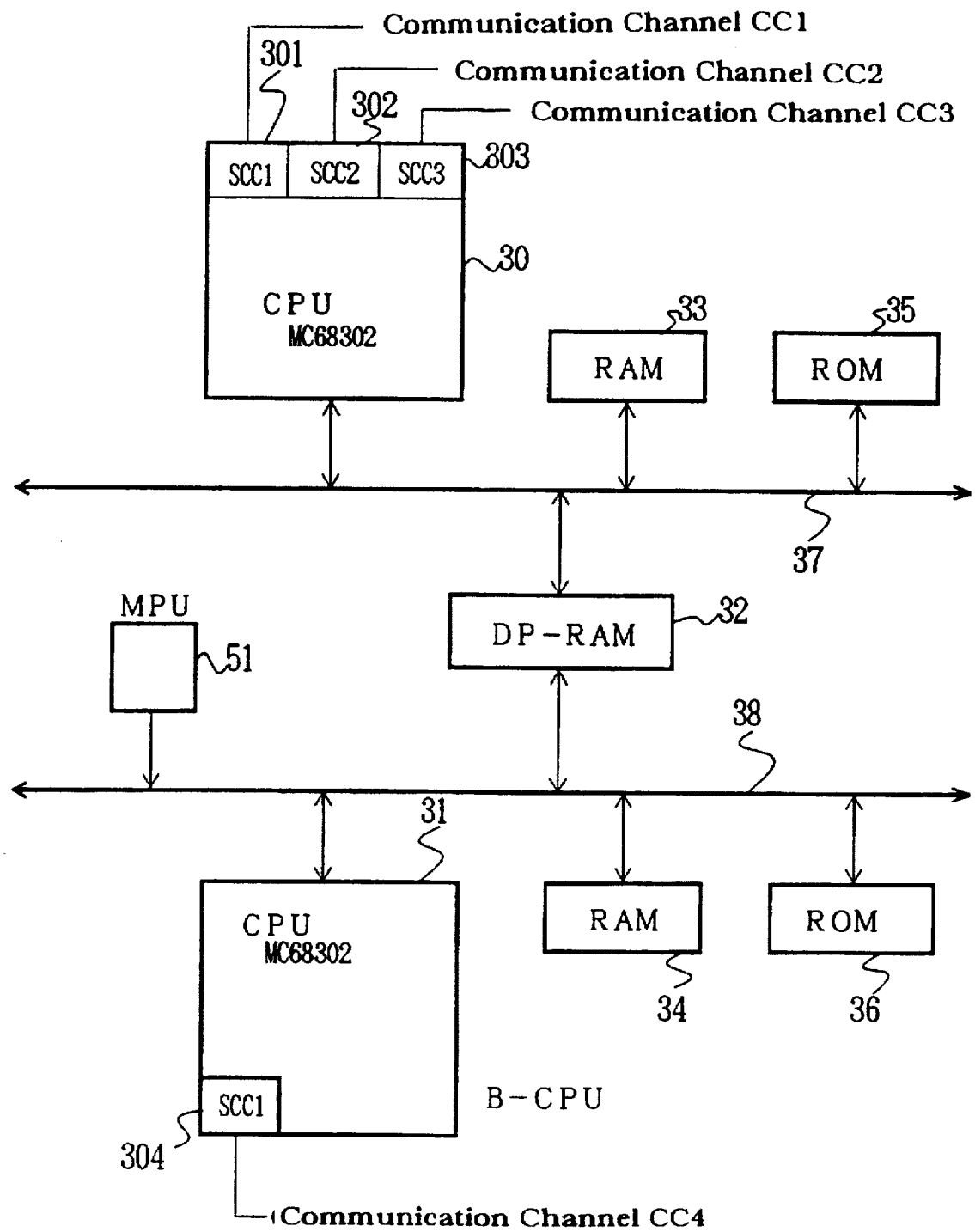
FIG. 6 is a block diagram showing one structural example of node equipment.

FIG. 6 shows a detailed structural block diagram of the interface circuit 53 for the operational support system applied to the controlling method according to the present invention as one embodiment in the network terminal equipment shown in FIG. 5, and further, it shows the relation between the micro processor unit 51 and the interface circuit 53.

In the diagram, reference numeral 30 is a CPU for controlling the OSI-7th layer, and controlling the communication interface with the external equipment. The CPU 30 has serial ports 301 to 303. The serial port 301 is connected to the network administration equipment via the channel CC1. Further, the serial ports 302 and 303 are connected to other node equipment via the communication channels CC2 and CC3, respectively.

A CPU 31 controls the associations, generates and analyzes the communication channels. The CPU 31 having a serial port 304 is locally connected to the network monitoring equipment that is a dumb terminal, not shown in the diagram, via the communication channel CC4.

A dual port RAM 32 has a function for providing an interface between the CPU 30 and the CPU 31. RAMs 33 and 34 are used as a storing or working area of data corresponding to the CPUs 30 and 31.

ROMs 35 and 36 are used for storing the control programs corresponding to the CPUs 30 and 31, respectively. The CPU 30, the RAM 33, and the ROM 35 are connected via a bus 37, and the CPU 31, RAM 34, and ROM 36 are connected via a bus 38.

The alarm signal and the operation monitoring signal are sent from the micro processor unit 51 shown in FIG. 5 connected to the bus 38, as described above.

Figure 7:
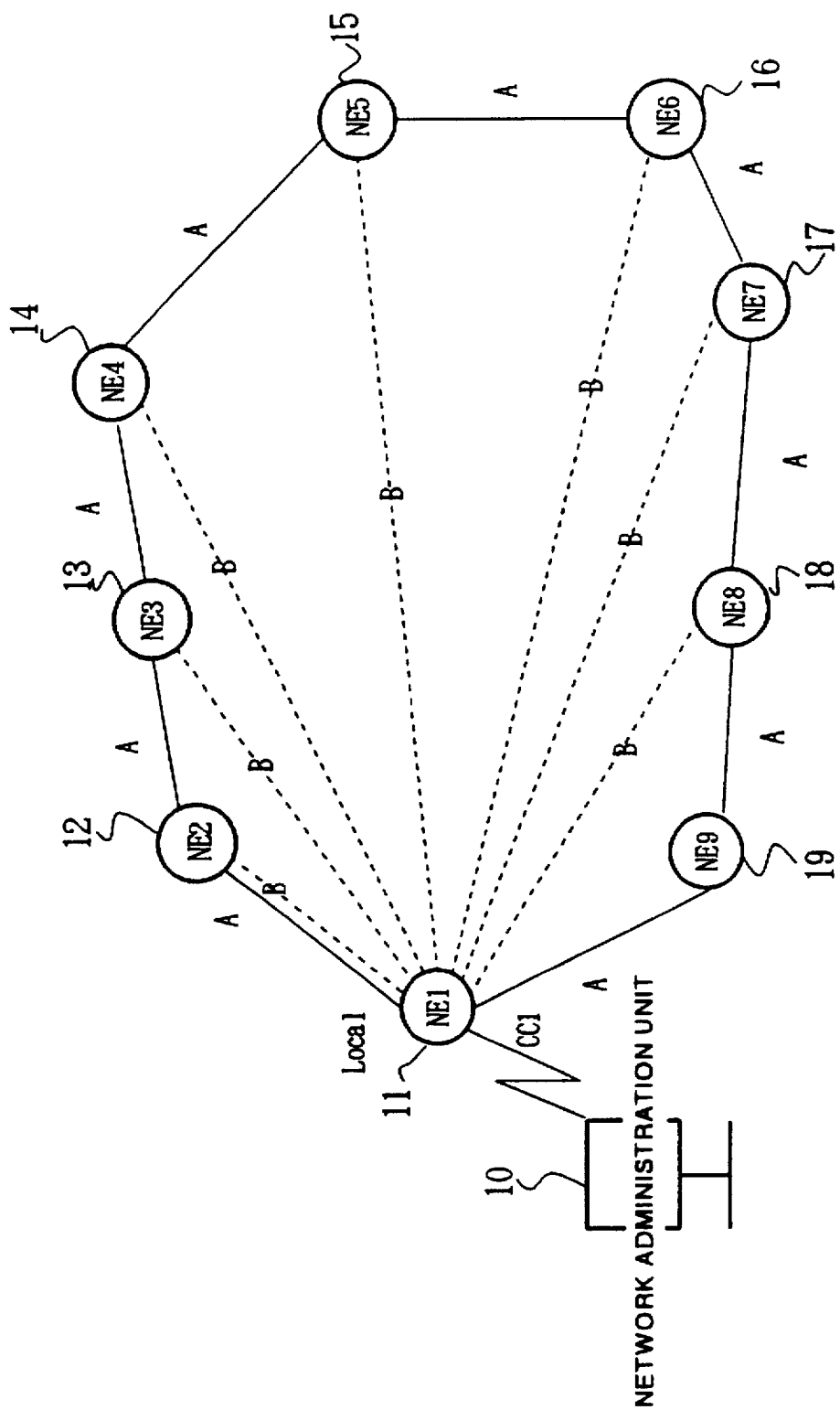
FIG. 7 is a structural diagram of network for explaining one embodiment of the present invention.

FIG. 7 is a structural diagram of a loop network for explaining one embodiment of the controlling method according to the present invention.

In the structure of this embodiment, the node equipment (NE) 11 to 19 that are a plural of communication equipment are connected with a ring form, and the interface circuit 53 for the operational support system has the same structure as that shown in FIG. 6, as described above, in each node equipment.

The node equipment 12 to 19 are a plural of communication equipment positioned remotely. To be concretely, they are optical terminal repeating equipment. The plural terminal equipment, not shown in the diagram, are further connected to each of the node equipment.

Further, in FIG. 7, the node equipment 11 becomes a communication terminal equipment provided with the network administration equipment 10, in the case where the equipment 11 is local node equipment (NE).

Accordingly, the interface circuit 53 for the operational support system shown in FIG. 6 is provided in the node equipment 11. More particularly, the network administration unit 10 is connected to the serial port 301 in the CPU 30 via the channel CC1, as described in FIG. 6.

In the case where each node equipment 12 to 19 is a remote node equipment, other node equipment is locally connected to the serial ports 301 to 303 in the CPU 30 via the channels CC1 to CC3.

The communication is performed by DCC (Data Communication Channel) in the SDH frame shown in FIG.

5-3/G708 of the above-described ITU-T recommendation G708, between the network administration equipment 10 connected via the channels CC1 to CC3 to the serial ports 301 to 303 in the CPU 30 of the local node equipment 11 and other node equipment 12 to 19 that are remote node equipment.

In FIG. 7, a solid line A shows a physical channel path between nodes, and a broken line B shows the confirmation of associations on the application between each node equipment. The confirmation of application shown with the broken line B is confirmed according to the demand from both nodes.

Figure 8:
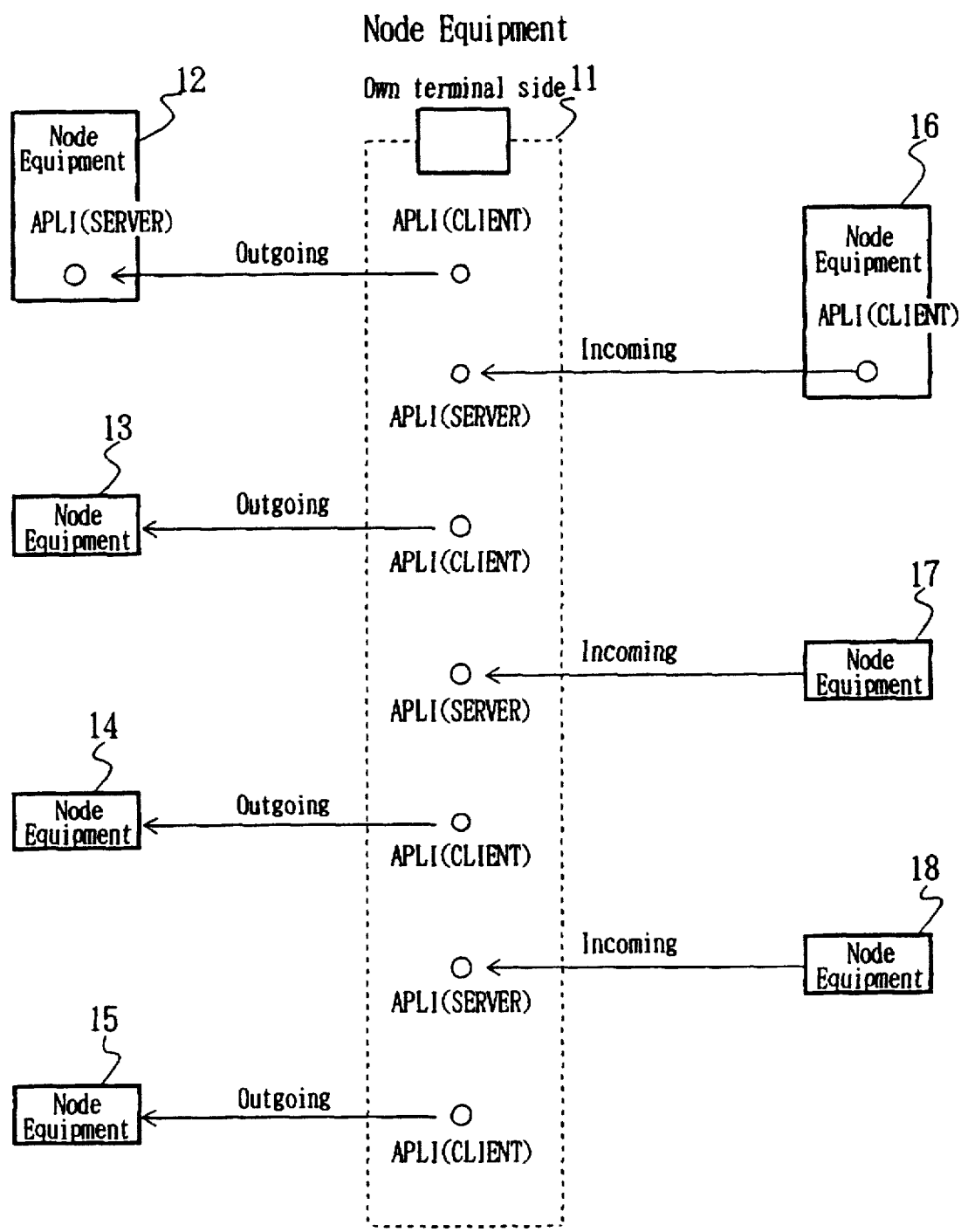
FIG. 8 is an explanatory diagram of association confirmation.

FIG. 8 shows one example as a form of the confirmation of association B. That is, reference numerals 11 to 18 are a plural of node equipment (NE), and APL1 means application in FIG. 8.

When the local node equipment (NE1) 11 is considered as an own terminal, there are two cases as a form of confirmation of associations, as follows. One is a case for confirming by sending the association confirmation request to the faced remote node equipment 12 to 18 from the own terminal, and another is a case for confirming by receiving the association confirmation request from the faced remote equipment in the own terminal.

The APL1 on the side of node equipment that sends the association confirmation request from the own node is called as a client, and the APL1 on the side of node equipment that receives the association confirmation request is called as a server.

Further, it is defined that the client for sending the association confirmation request from the own node is outgoing, and the server for receiving the association confirmation request from the faced remote node equipment conversely is incoming.

In the form for confirming the associations, the confirmation of the associations in each node equipment is limited in number. Accordingly, it becomes possible according to the present invention to keep a sending path from the own terminal or a receiving path from the faced equipment, by making, at least, one channel idle, in the case where much more association are confirmed.

For example, the association confirmation request is sent by using the idle channel to confirm a new association to other node. Then, the idle channel is lost, so that the server is given the top priority, here. One channel that is not used lately is selected and disconnected to the association of outgoings employing before, and made in the idle status to store for next occurrence.

Conversely, it is also possible to confirm the associations by disconnecting the outgoing, in the case where the association confirmation request (ASC-REQ) is sent from the faced node equipment, similarly.

Hereupon, In the case where the maximum of the confirmation number in the application level exceeds (BUSY), when a new association is confirmed, the association confirmation request (ASC-REQ) is refused, and the association reject response (ASC-REJ-RSP) is replied.

Here, the timer is started to wait for the response in the same time of sending the association confirmation request (ASC-REQ) on the sending side. When the association rejection response (ASC-REJ-RES) is received then, the association confirmation request (ASC-REQ) is resent after the fixed time later. The processing is repeated until the association is confirmed.

In this way, in the case where the confirmation of associations is limited in number, the association confirmation request (ASC-REQ) is retransmitted as a busy control. Further, the associations are disconnected for reasons of the faced node equipment's own, although the incoming cannot be disconnected in the own node equipment, with the server priority system, because the faced node equipment side becomes outgoing, and therefore, it is possible to use the limited number of associations efficiently, as an entire system, so that it is possible to control associations effectively.

For example, the case where the association confirmation request is sent from other node equipment, while the users operating one node equipment, which is in the remote location with the confirmed association from the own node equipment interrupts the operation for a several minutes will be considered as follows. Then, if the own node equipment is in busy status, that is, the finite value of the association exceeds, there is a possibility to disconnect the used association before.

However, as the association disconnected in the own node equipment is reconfirmed, when the user sends the command again, it is possible for the user to continue operating without being conscious of the association confirmation/disconnection.

Figure 9:
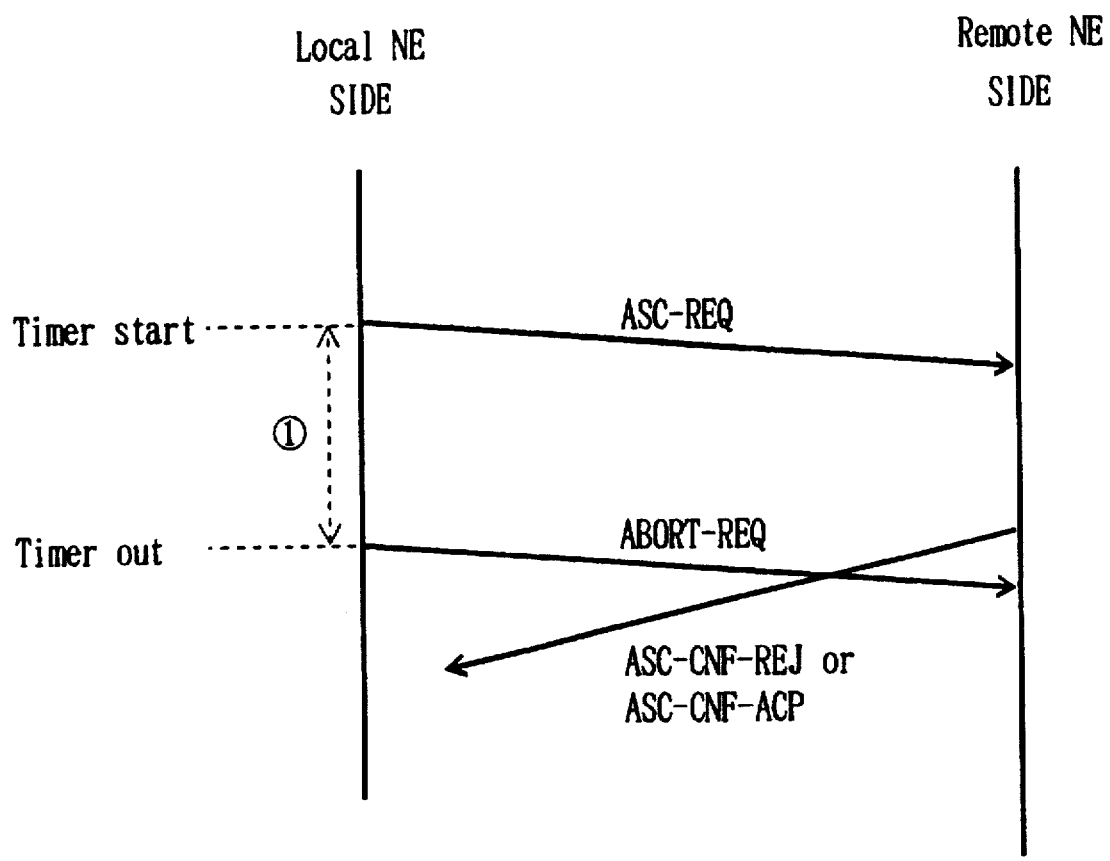
FIG. 9 is a time out sequence in a busy protocol.
Figure 10:
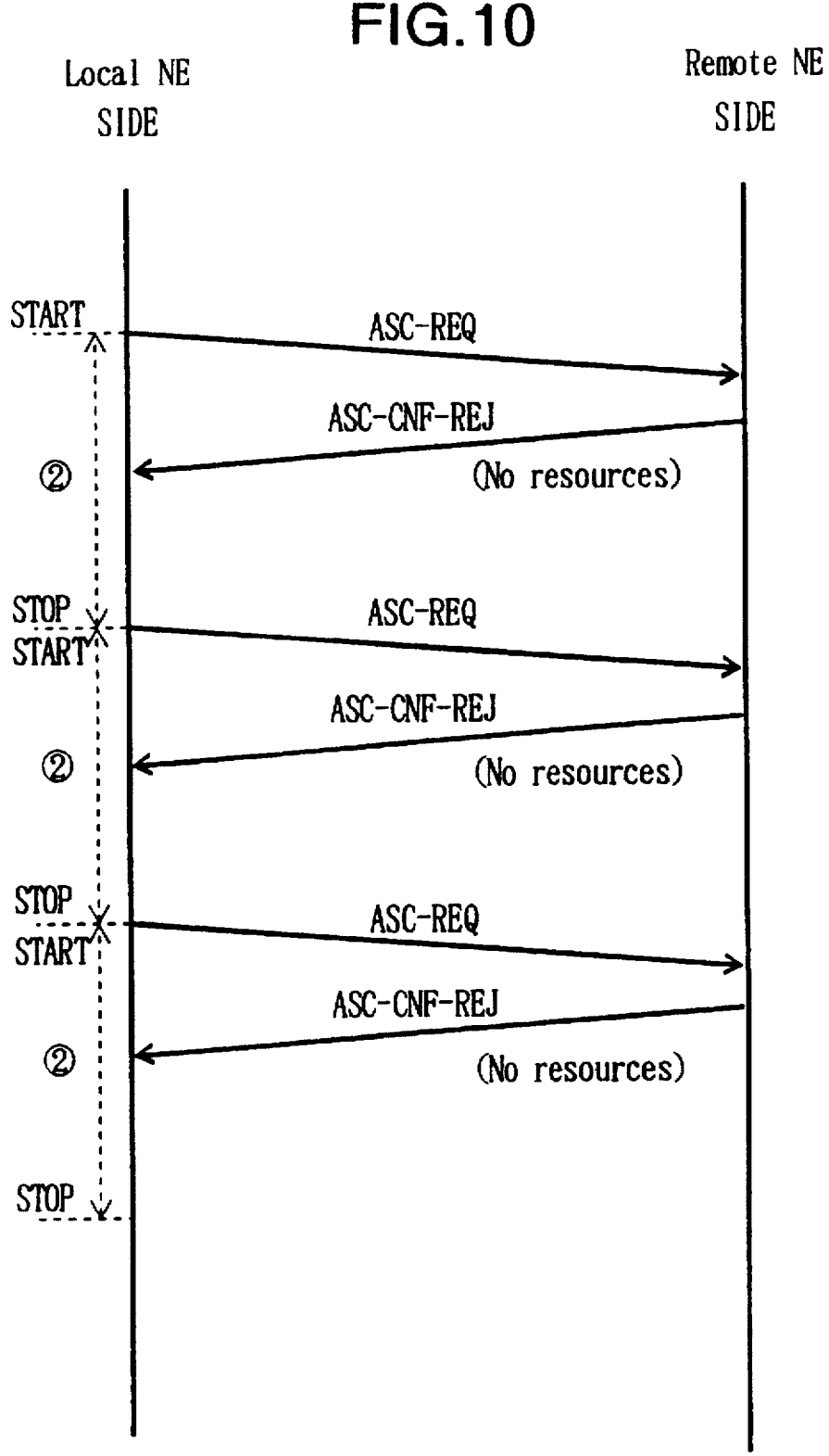
FIG. 10 is an association busy control sequence in a busy protocol.

FIGS. 9 and 10 show embodiments of a busy protocol according to the present invention.

More particularly, FIG. 9 is a diagram showing the association busy control sequence, and FIG. 10 is a diagram showing an association busy control sequence.

In FIGS. 9 and 10, (ASC-REQ) means the association confirmation request sent from the local node equipment (NE) 11 shown in FIG. 7, (ASC-CNF-ACP) means the association confirmation acceptance from the node equipment according to the remote node equipment (NE2 to 9) 12 to 19 shown in FIG. 7, (ASC-CNF-REJ) means the association confirmation rejection from the corresponding node equipment, and (ABORT-REQ) means the association confirmation abortion request.

Further, ① of FIG. 9 shows a maximum counting value of response waiting timer, and ② of FIG. 10 shows a maximum counting value of an interval timer of the association confirmation request. The maximum counting value ① of the response waiting timer is set smaller than the maximum counting value ② of the interval timer.

FIGS. 9 and 10 show a sequence in the case where the association confirmation rejection (ASC-CNF-REJ) is not sent or the association confirmation acceptance (ASC-CNF-ACP) is not received from the remote node equipment to the association confirmation request (ASC-REQ), which is sent from the local node equipment (NE1) 11, within the predetermined time under the above-described definition.

That is, the response waiting timer is started with sending the association confirmation request (ASC-REQ) in the local node equipment (NE1) 11. After that, the response from the remote node equipment is waited to make the association confirmation rejection (ASC-CNF-REJ) or the association confirmation acceptance (ASC-CNF-ACP) within the time out effective.

Accordingly, the association confirmation abortion request (ABORT-REQ) is sent in concurrence with the time out to abort the association confirmation.

Further, the latter received response is ignored, no matter what the consequences may be. And the association confirmation request (ASC-REQ) is not also retransmitted.

FIG. 10 shows an association control sequence of the local node equipment (NE1) 11 on the busy state in the remote node equipment.

In here, the busy condition is defined to mean that the association confirmation number has been already reached to the maximum value of the equipment (No resources). In the same diagram, the association confirmation rejection (ASC-CNF-REJ) based on (No resources) from the remote node equipment is received in the local node equipment (NE1) 11 within the response time.

When the message of the association confirmation rejection (ASC-CNF-REJ) is received in the local node equipment (NE1) 11, the reasons of the rejection is identified. When it is confirmed that the reason of the rejection is (No resource), the association confirmation request (ASC-REQ) is retransmitted, after the interval time out (②) of FIG. 10).

Then, when the reason of the rejection is other than (No resources), for example, the reason is because any unit of the node has been physically pulled out or electrically disconnected from the equipment, the association confirmation request (ASC-REQ) is not retransmitted after then, and finished sending the request as an error.

In the example shown in FIG. 10, the maximum times for retransmitting the association confirmation request (ASC-REQ) is limited to 2 times, and the request is not retransmitted twice and over.

Figure 11:
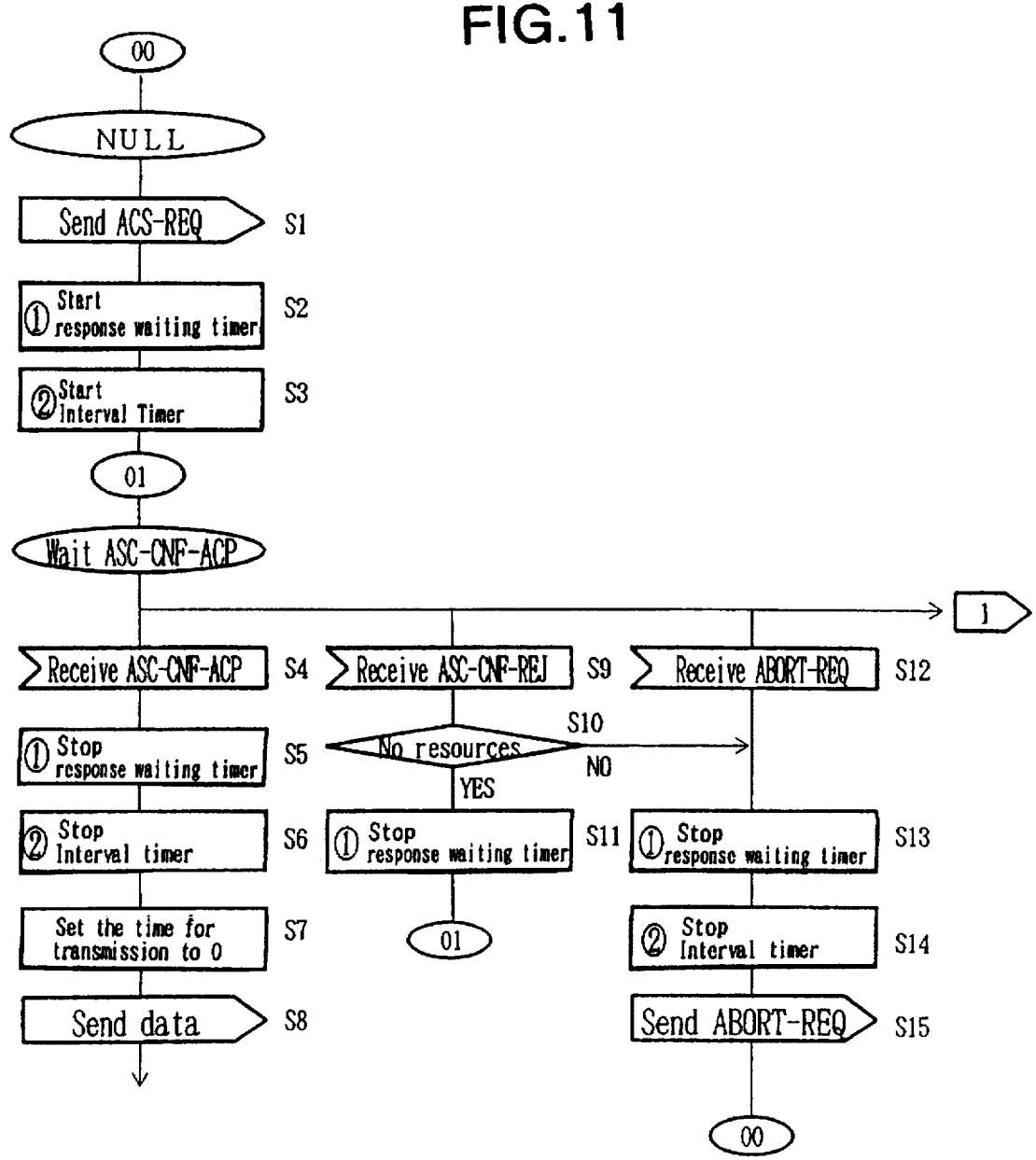
FIG. 11 is a diagram showing conversion of an operational status (No. 1) for an association confirmation request.
Figure 12:
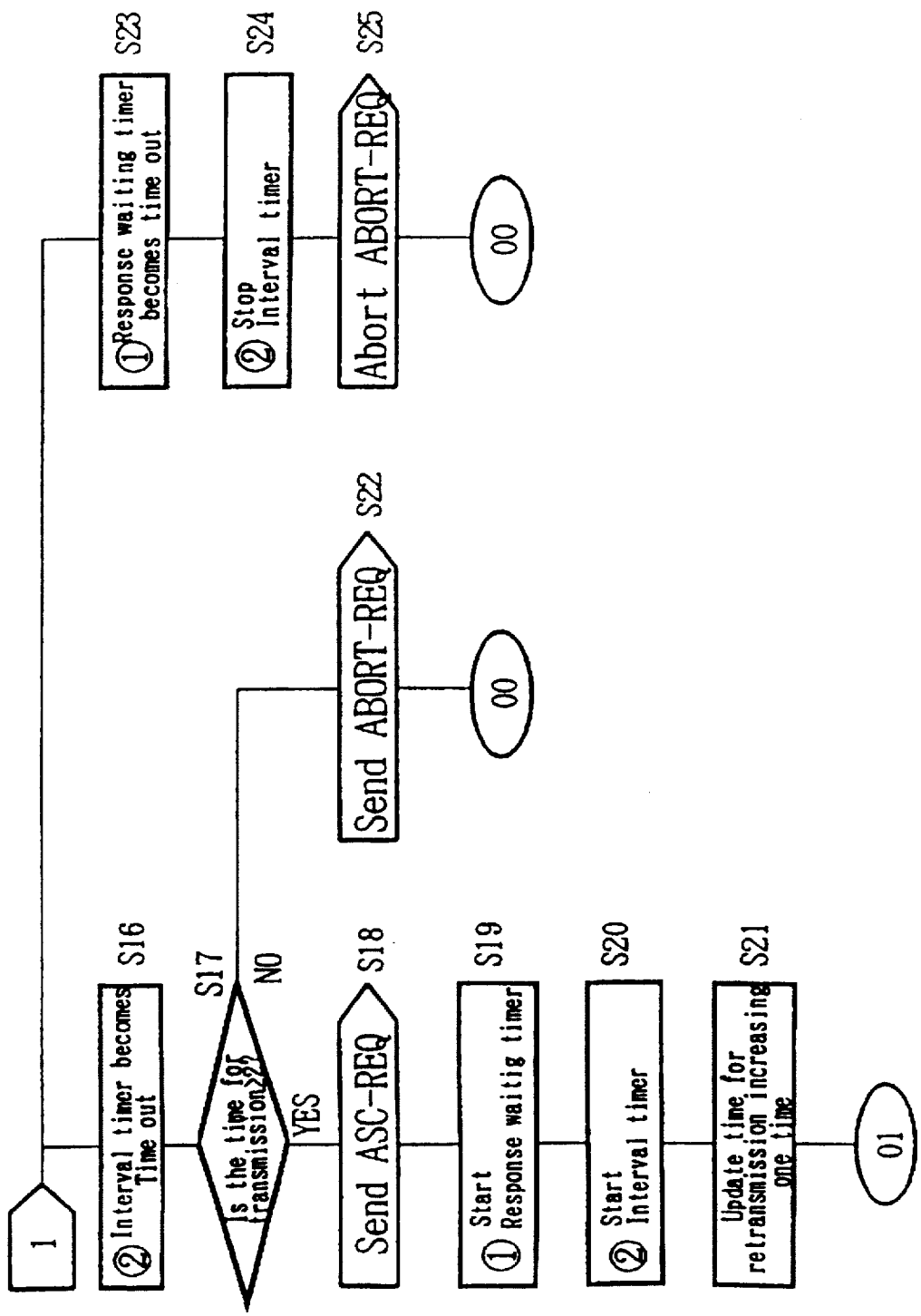
FIG. 12 is a diagram showing conversion of an operational status (No. 2) for an association confirmation request.
Figure 13:
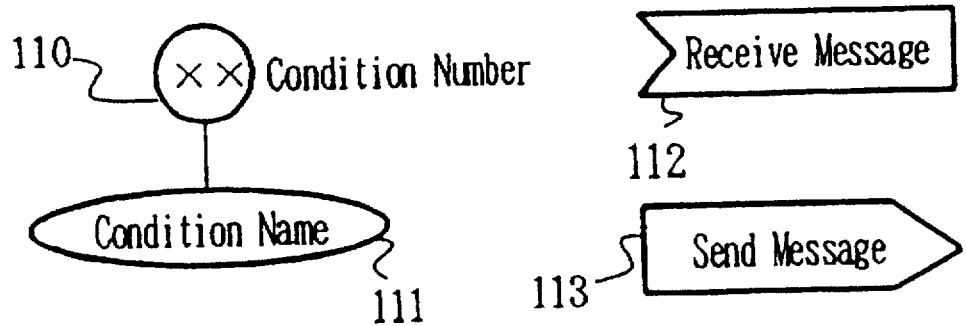
FIG. 13 is a diagram for explaining symbols illustrated in a diagram showing conversion of an operational status.

FIGS. 11 and 12 show diagrams showing transition of the above-described operation sequence condition. Further, meaning of the symbols shown in the diagram showing transition of condition is shown in FIG. 13. As shown in FIG. 13, 110 means the condition number, and 111 means the condition name. Further, 112 means the message reception, and 113 means the message sending.

Returning to FIG. 11, the association confirmation request (ASC-REQ) is sent in the resetting condition (00), at first (STEP S1). The response waiting timer and the interval timer are started (STEPs S2 and S3). Then, it becomes in the condition to wait for the association confirmation acceptance (ASC-CNF-ACP) (01).

If the message of the association confirmation acceptance (ASC-CNF-ACP) is received before the response waiting time out from the condition (01) to wait the association confirmation acceptance (ASC-CNF-ACP) (STEP S4), the response waiting timer is stopped (STEP S5), and the interval timer is stopped, similarly (STEP S6).

Next, the time for retransmission is set to 0 (STEP S7), and the data is sent (STEP S8).

Meanwhile, if the association confirmation rejection (ASC-CNF-REJ) is received before the response waiting time out from the condition to wait the association confirmation acceptance (ASC-CNF-ACP) (01) (STEP S9), it is judged whether it is rejected by the reason of (No resources), that is, busy condition, or not (STEP S10).

In the case where it is rejected by the reason of (No resources), the response waiting timer is stopped (STEP S11) to control to be in the response waiting condition (01). However, in the case where it is rejected not by the reason of (No resources), the response waiting timer is stopped (STEP S13), and the interval timer is also stopped simultaneously (STEP S14). Then, the association confirmation abortion request (ABORT-REQ) is sent (STEP S15) to be in the condition of reset (00).

The processes of steps S13 through S15 are also executed in the case where the association confirmation abortion request (ABORT-REQ) is received from the remote node equipment in the condition to wait the response (01) (STEP S12).

FIG. 12 shows a process in case of being the response waiting time out in the condition to wait the response (01).

The response waiting timer is stopped and further the interval timer becomes time out (STEP S16), and the times for retransmitting the association confirmation request (ASC-REQ) is judged (STEP S17).

In the case where the times for retransmission does not exceed 2, as described that the maximum times for retransmission is 2, the association confirmation request (ASC-REQ) is sent again (STEP S18).

Then, the response waiting timer is started (STEP S19) and the interval timer is started (STEP S20). Next, the times for retransmission is updated by increasing one (STEP S21).

In the case where the times for retransmission exceeds 2 and over, the message of the association confirmation abortion request (ABORT-REQ) is sent (STEP S22) to be in the initial reset condition (00).

Meanwhile, as shown in FIG. 9, in the case where the response waiting timer becomes time out in the condition to wait the response (01) (STEP S23), the interval timer is stopped if necessary (STEP S24) to abort the association confirmation request (ABORT-REQ) (STEP S25) to be in the initial reset condition (00).

In here, each of above-described steps controls based on the control program stored in the ROM 35 by the CPU 30 in the structural block diagram of the node equipment shown in FIG. 6.

Figure 14:
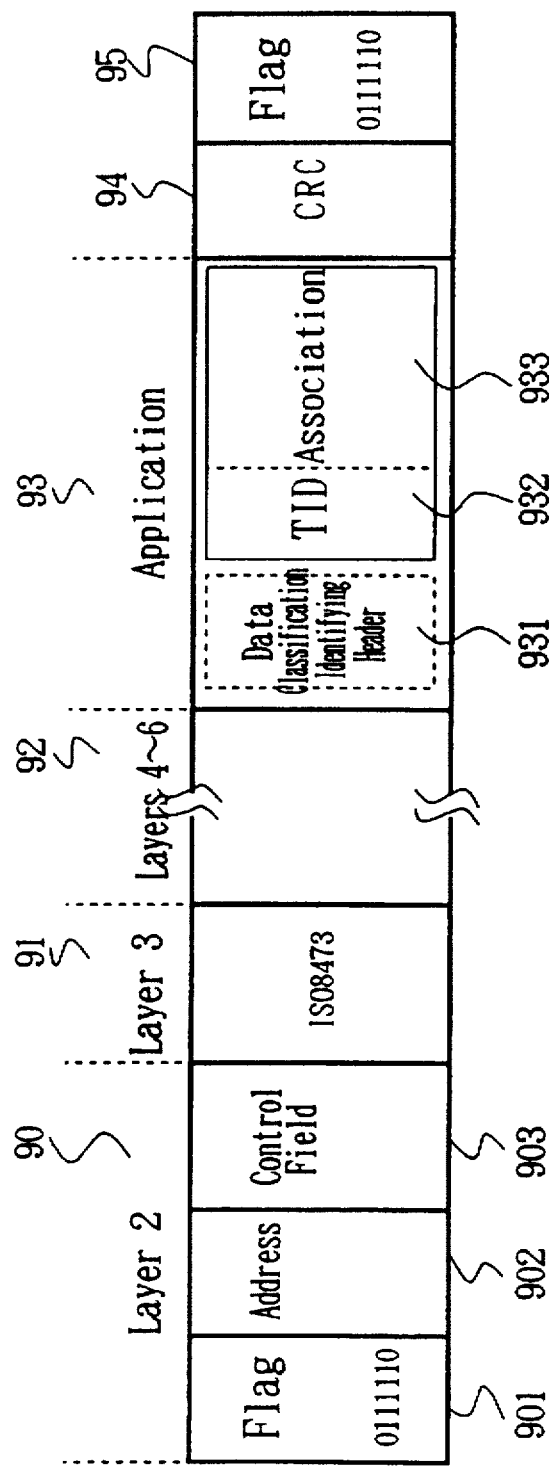
FIG. 14 is a structural example of a data frame format.

Further, the command/response and the data in each sequence are sent based on the data frame format shown in FIG. 14. In the format shown in FIG. 14, a field 90 for the layer 2 has a starting flag 901, an address field 902, and a control field 903. The starting flag 901 has a bit pattern of "0111110".

The address field 902 is used for identifying it is a command or a response. If it is the command, the address of the receiving terminal is set, and if it is the response, the address of the transmitting terminal is set.

The kinds of command/response for notifying to the connected terminal and the frame number are set in the control field 903. Therefore, the order control and the error restoring can be executed.

A field 91 for the layer 3 has the contents based on ISO 8473. For example, the information to show by which network it is connected to the connected equipment via which node equipment (NE) and the like is specified in the field. The fields for layers 4 through 6 are provided in the address field 92 if necessary. An application field 93 is a field corresponding to the layer 7. The application field 93 has a data classification indicating header 931, a terminal Identification number (TID) 932, and an association 933.

As described above, the content of the command or the response, such as the association confirmation request (ASC-REQ), which is sent from the node equipment in the steps for confirming the associations is specified as a sending data in the association 933.

A code CRC for error correction is specified in a field 94 for frame check.

A flag 95 showing the end of the frame has the same pattern as the starting flag 901.

Figure 15:
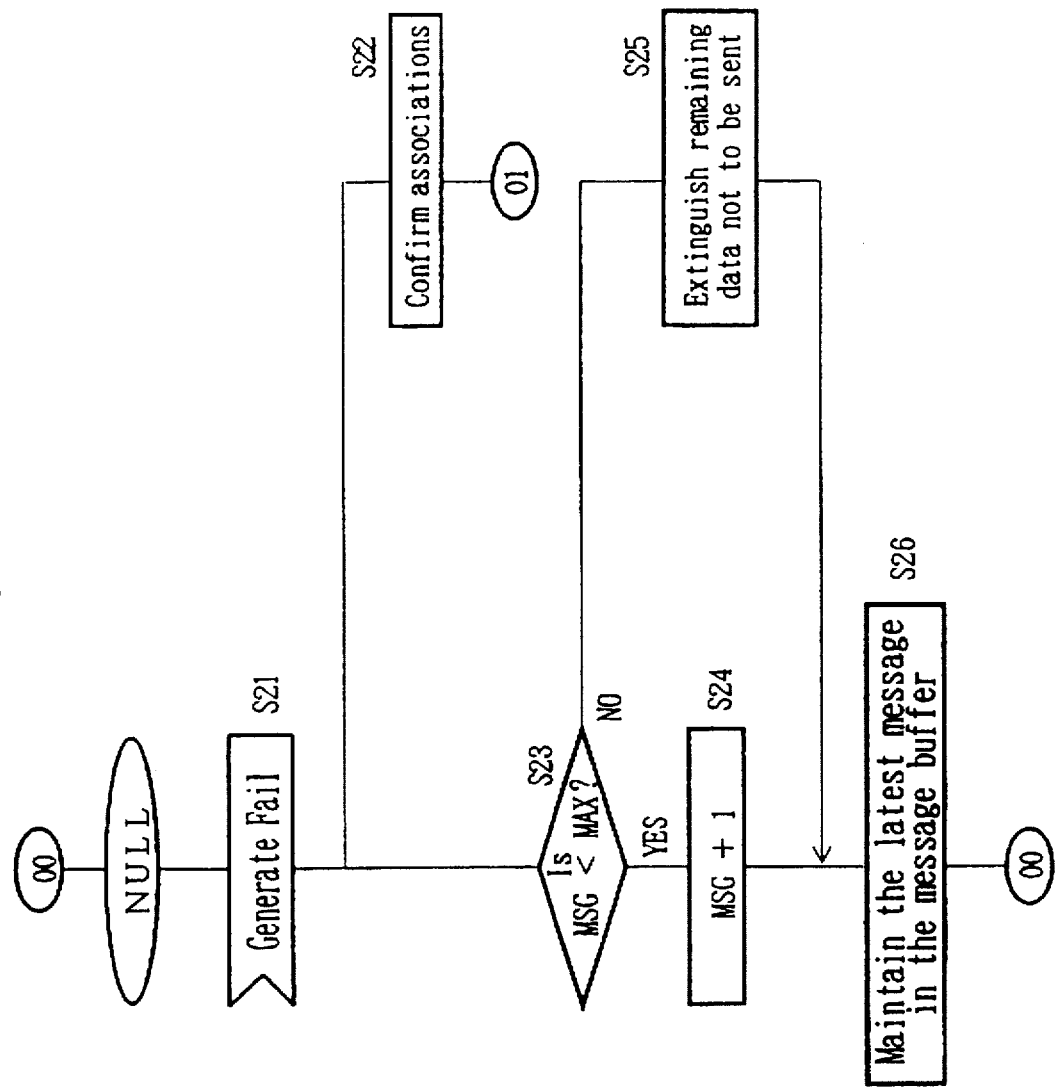
FIG. 15 is a diagram showing conversion of a buffer memory status (No. 1).
Figure 16:
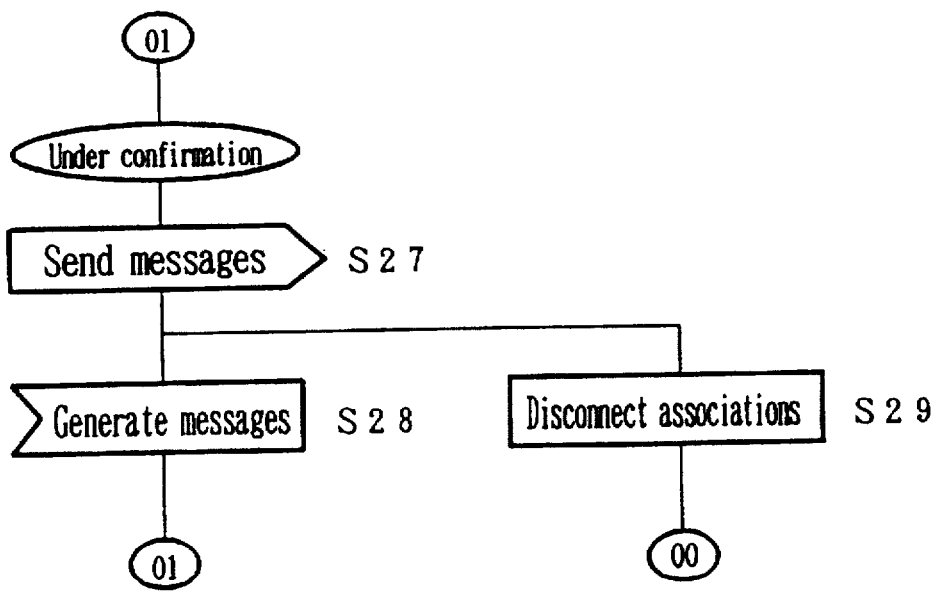
FIG. 16 is a diagram showing conversion of a buffer memory status (No. 2).

FIGS. 15 and 16 illustrate diagrams showing transition of the condition of storing in the RAM 33 that is a buffer memory in the node equipment. The meaning of each condition in those diagrams is the same as those described in FIG. 13.

If a fail is generated in the remote node equipment in which the association is not confirmed, the message showing the fail generation is sent to the local node equipment (NEl) 11 (STEP S21).

In this case, the faced remote node equipment sends the association confirmation request (ASC-REQ) for confirming the associations to the local node equipment (NE1) 11 (STEP S22). The procedure for confirming the associations is the same as those described in FIGS. 9 through 12.

When it is possible to confirm the associations, the condition (00) converses to the condition (01) shown in FIG. 16. Then, the message is sent from the remote node equipment (STEP S27), and it is received in the local node equipment (NE 1) 11 (STEP S28).

If it is required, the association is disconnected without receiving in the local node equipment (NE1) 11 (STEP S29).

Hereupon, the local node equipment (NE1) 11 is in the condition of (No resources), the data due to send is maintained in the RAM 33 (refer to FIG. 6) used as a buffer memory in the remote node equipment, and retransmitted it as shown in FIG. 10.

Further, if the data due to send can not be always sent, the data is maintained in the RAM 3, continuously. The number of messages is increased one every time the data is maintained (STEP S24), and the latest data is maintained in the RAM 33.

However, if the number of the messages (MSG) exceeds the maximum capacity of the message buffer (STEP S23), the data is updated into the RAM 33 after then. Then, the remaining data not to be sent extinguishes (STEP S25), and the latest message is maintained in the message buffer (STEP S26). The fact of the data extinguishment remains as a log.

FIG. 17 is a diagram showing the concept in the case where the association confirmation between one remote node equipment and another remote node equipment is controlled in the local node equipment (NE1) 11 with the network structure shown in FIG. 7.

In the diagram, the condition of confirming the association with each node equipment is expressed with squares. This condition data is stored in the RAM 33 corresponding to the CPU 30 in the structure of the node equipment shown in FIG. 6.

In FIG. 17, the dotted squares attached to the numbers of each node equipment show the confirmation of the association with the server side (Incoming), and the normal squares attached to the numbers of each node equipment show the confirmation of the association to the client side in the local node equipment (Outgoing). The empty square shows the idle condition.

In the diagram, the associations confirmed in the local node equipment (NE1) 11 are arranged in order of time. The maximum confirmation number is 7 and the maximum incoming number is 5.

(A) of FIG. 17 shows the case where there is an association confirmation request from the remote node equipment 19 (NE9) on the condition that the local node equipment (NE1) 11 confirms the associations with the remote node equipment 12 (NE2) to 18 (NE8), respectively.

The association confirmation with the remote node equipment 19 (NE9) is accepted in the local node equipment (NE1) 11 to maintain the association that becomes incoming preferentially. The association abortion is requested and released to the remote node equipment 15 (NE5) which transferred the last message at the oldest time.

The associations with the remote node equipment 19 (NE9) is confirmed and registered |(B) of FIG. 17|.

Next, when the association confirmation request is sent from the remote node equipment 15 (NE5) |(C) of FIG. 17|, the association abortion is requested and released to the remote node equipment 16 (NE6), by having preference to the incoming, similarly |(D) of FIG. 17|.

On the condition of (D) of FIG. 17, in the case where the association confirmation is requested from the local node equipment (NE1) 11 to the remote node equipment 16 (NE6) |(E) of FIG. 17|, the oldest remote node equipment 17 (NE7) which is outgoing is disconnected and released |(F) of FIG. 17|.

In this way, the local node equipment (NE1) 11 keeps the condition by making one association idle. Accordingly, it becomes possible to send the association confirmation request from the local node equipment (NE1) 11 any time, by making one association, which is used as an entrance for confirming or requesting the associations, idle. Similarly, it is possible to receive the association confirmation request from the remote node equipment.

(G) of FIG. 17 shows the case where the association confirmation is requested from the remote node equipment 17 (NE7) on the condition that the confirmation number of incoming is the maximum of 5, in the local node equipment (NE1) 11.

In this case, the association is confirmed temporarily, and the association is released after the error response in the application level is transferred |(H) of FIG. 17|.

Figure 18:
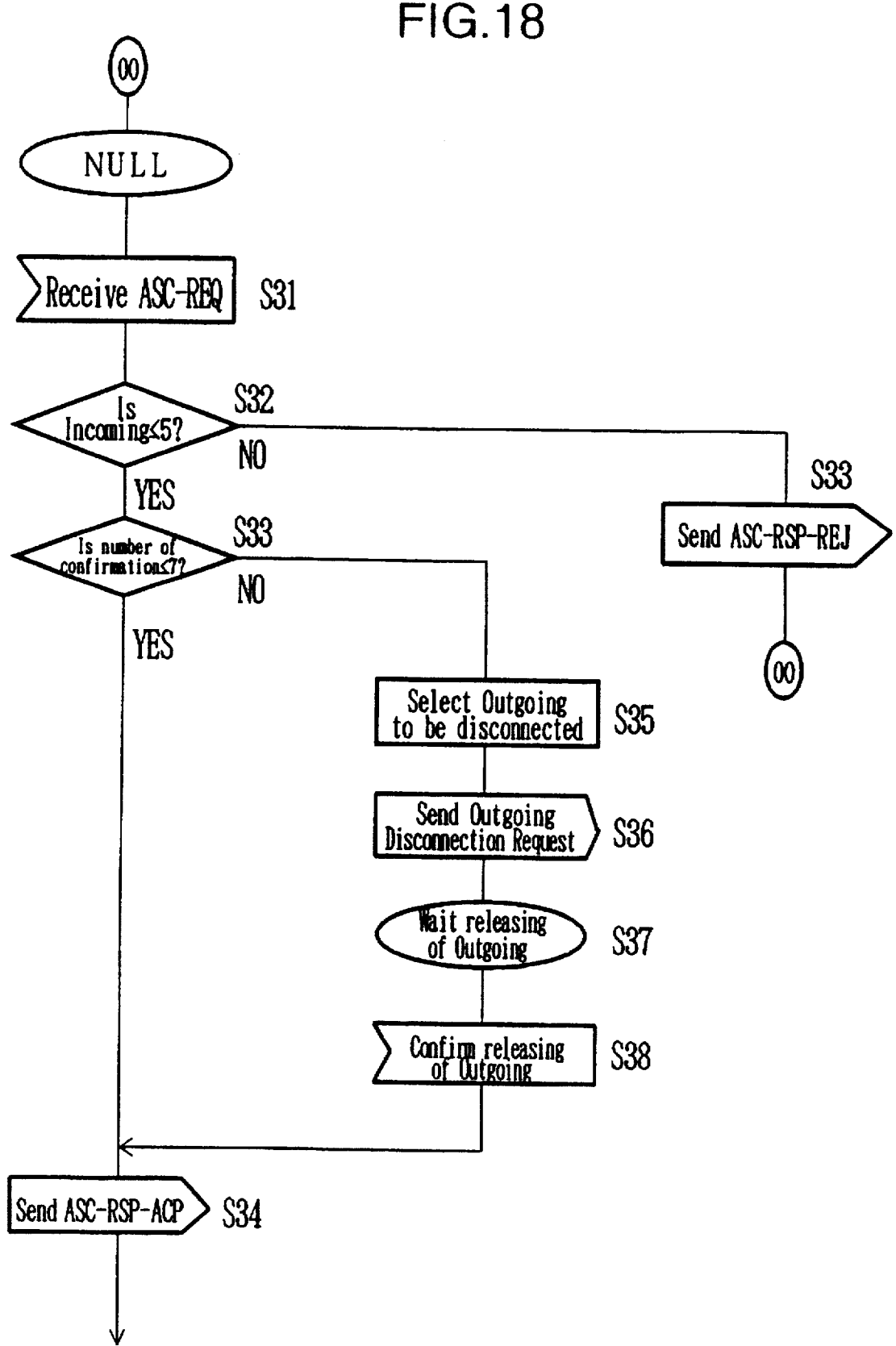
FIG. 18 is a diagram showing conversion of a status for explaining an association managing algorithm.

FIG. 18 shows a diagram showing transition of condition in the association administration algorithm. If the association confirmation request (ASC-REQ) is received (STEP S31), the received node equipment judges whether the number of confirming incomings exceeds the maximum of 5 or not, at first (STEP S32).

When it exceeds the maximum value, the association confirmation rejection (ASC-RSP-REJ) is sent to the faced side (STEP S33). In the case where it does not exceed the maximum value, the confirmation number of association is checked, after then (STEP S33).

If the confirmation number of association does not exceed the maximum value of 7, the association confirmation acceptance (ASC-CON-ACP) is sent to the faced side to confirm the association (STEP S34).

If the confirmation number of association exceeds the maximum value of 7, the outgoing is selected to disconnect (STEP S35). The outgoing is disconnected by selecting the association having the oldest access time of outgoing.

The association disconnection request is sent to the faced node equipment corresponding to the association of the selected outgoing (STEP S36), the releasing of outgoing is waited (STEP S37), and the association confirmation acceptance (ASC-RSP-ACP) is sent to the faced side in the time for confirming the releasing of outgoing (STEP S38) to confirm the association (STEP S34).

As explained according to the embodiment, it becomes possible according to the present invention to confirm the association effectively, by using the incoming priority and retransmission function of the association as a busy control, in the case where the confirmation of the associations is limited in number.

More particularly, it is possible to send the message from each node equipment to the network administration unit, even if it is in the network in which the node number is very larger than the limited number of the association confirmation.

Accordingly, the effective use of limited number of association brings the easy operation of the communication terminal equipment suitable to the OSI standard, and better improvement of the maintenance service.

The present invention may be embodied in other specific forms without departing from the spirit or essential characteristics thereof. The present embodiment is therefore to be considered in all respects as illustrative and not restrictive.

It should of course be understood that those which are the same as the technical concept of the invention are within the protective scope of this invention.

What is claimed is:

1. A method for controlling confirmation of associations on an application layer of Open Systems Interconnection between one communication equipment and faced communication equipment, comprising the steps of:

sending an association confirmation request from the one communication equipment to the faced communication equipment to confirm an association between the one communication and the faced communication equipment on an application layer of Open Systems Interconnection;

identifying a reason of rejection in the one communication equipment, in the case where the faced communication equipment rejects the association confirmation request;

retransmitting the association confirmation request according to the reason of rejection;

counting times for retransmission; and finishing transmitting of the association confirmation request, in the case where the count value of the times for retransmission exceeds a predetermined value.

2. A method for controlling the confirmation of associations on an application layer of Open Systems Interconnection between one communication equipment and faced communication equipment, comprising the steps of:

sending an association confirmation request from the one communication equipment to the faced communication equipment;

identifying a reason of rejection in the one communication equipment, in the case where the faced communication equipment rejects the association confirmation request;

retransmitting the association confirmation request according to the reason of rejection;

counting times for retransmission;

finishing transmitting of the association confirmation request, in the case where the count value of the times for retransmission exceeds a predetermined value; and wherein a response waiting timer is started concurrently with sending the association confirmation request from the one communication equipment to the faced communication equipment and an abortion request is sent to the faced communication equipment when the count of the response waiting timer exceeds a predetermined time to finish transmitting of the association confirmation request.

3. A method for controlling confirmation of associations on an application layer of Open Systems Interconnection between one communication equipment and faced communication equipment, comprising the steps of:

sending an association confirmation request from the one communication equipment to the faced communication equipment;

storing messages to be sent in a buffer memory of the one communication equipment and resending the association confirmation request to the faced communication equipment, when the faced communication equipment rejects the association confirmation request; and overwriting with the messages to be sent on old messages maintained into the buffer memory, in order to delete the old messages, when the messages to be sent exceed a space capacity remaining in the buffer memory; and recording in a log an indication that the old messages are deleted by overwriting.

4. A method for controlling confirmation of associations on an application layer of Open Systems Interconnection between one local node equipment and plural remote mode equipment comprising the steps of:

selecting an association from a plurality of associations, which have messages, in the order of time when the messages were sent; and disconnecting the selected association, when the one local node equipment becomes a client for originating the association confirmation request, and further new associations are confirmed and then the number of confirmed associations exceeds a predetermined number allowed for the one local node equipment.

5. The method for controlling the confirmation of associations on an application layer of Open Systems Interconnection according to claim 4, wherein the confirmed associations include a first association confirmed by an association confirmation request from remote node equipment where local node equipment becomes a server and a second association confirmed by an association confirmation request to the remote node equipment where the local node equipment becomes a client, and the first association is controlled so as to be confirmed in preference to the second association.

6. The method for controlling the confirmation of associations on an application layer of Open Systems Interconnections according to claim 4, wherein in addition to the confirmed association, there is further provided at least one idle association to keep associations from a local node equipment or allocable associations from the faced remote node equipment.

7. In a loop carrier system constituted by connecting one local communication equipment and plural remote communication equipment with a ring form, via channels, said one local communication equipment and plural remote communication equipment each comprising:

an interface circuit for supporting the loop carrier system, having a ROM for storing a program which controls association confirmation at a time of executing an application layer of Open Systems Interconnection between one communication equipment and faced communication equipment, and a CPU for executing the program for controlling the association confirmation, the CPU including serial ports connected to communication channels, and being connected to faced node, equipment via the serial ports for sending an association confirmation request to the faced communication equipment; and the local communication equipment identifying a reason of rejection when the faced communication equipment rejects the association confirmation request, retransmitting the association confirmation request according to the reason of rejection, counting the times for retransmission; and finishing retransmission of the association confirmation request, in the case where the count value of the number of retransmission exceeds a predetermined value.

8. In the loop carrier system according to claim 7, said one local communication equipment and plural remote communication equipment each further comprising a response waiting timer, which starts to count concurrently with sending the association confirmation request from one local communication equipment to the faced communication equipment, and sending an abortion request to finish retransmitting the association confirmation request, when a value counted by the response waiting timer exceeds a predetermined time.

9. In a loop carrier system constituted by connecting one local communication equipment and plural remote communication equipment with a ring form, via channels, said one local communication equipment and plural remote communication equipment each comprising:
- an interface circuit for supporting the loop carrier system, having;
- a ROM for storing a program, which controls association confirmation at a time of executing an application layer of Open Systems Interconnection between one communication equipment and faced communication equipment,
- a RAM, and
- a CPU including, serial ports connected to communication channels, and being connected to the faced node equipment via the serial ports for executing the program for controlling the association confirmation, and for sending an association confirmation request to the faced communication equipment,
- wherein the local communication equipment maintains messages due to send into the RAM and retransmits the messages to the faced remote communication equipment when the faced remote communication equipment rejects the association confirmation request; and
- updates the messages due to send and deletes the maintained messages, and records in a log an indication that the messages are deleted by updating, when the messages due to be sent exceed the capacity of the RAM.

10. In a loop carrier system constituted by connecting one local communication equipment and plural remote communication equipment with a ring form, via channels, said one local communication equipment and plural remote communication equipment each comprising:
- an interface circuit for supporting the loop carrier system, having a ROM for storing a program, which controls association confirmation at a time of executing an application layer of Open Systems Interconnection between one communication equipment and faced communication equipment, and a CPU for executing the program,
- wherein an association is selected from a plurality of associations, which have messages, in the order of time when the messages were sent, and the selected association is disconnected, when the one local node equipment becomes a client for originating the association confirmation request, and further new associations are confirmed whereby the number of confirmed associations exceeds a predetermined number allowed for the one local node equipment.

11. The loop carrier system according to claim 10, wherein the confirmed associations include a first association confirmed by an association confirmation request from remote node equipment, where local node equipment becomes a server, and a second association confirmed by an association confirmation request to the remote node equipment where the local node equipment becomes a client, and the first association is controlled so as to be confirmed in preference to the second association.

12. The loop carrier system according to claim 10, wherein in addition to the confirmed association, there is further provided at least one idle association to keep associations from a local node equipment or allocable associations from the faced remote node equipment.

* * * * *